Dec. 4, 1928.
E. A. BOHLMAN
CONDENSER
Filed Aug. 15, 1924
1,693,588
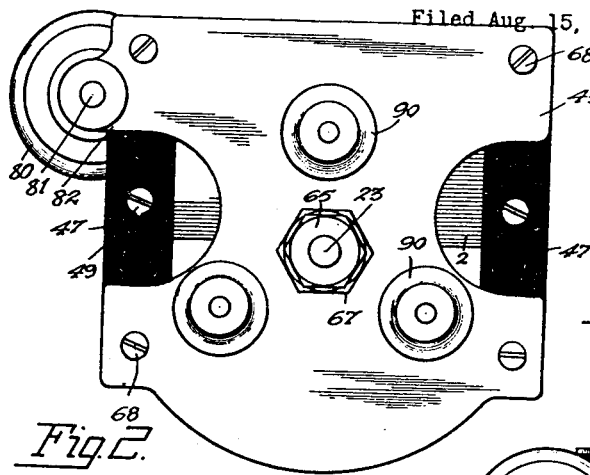
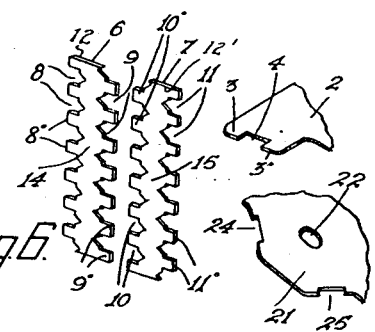
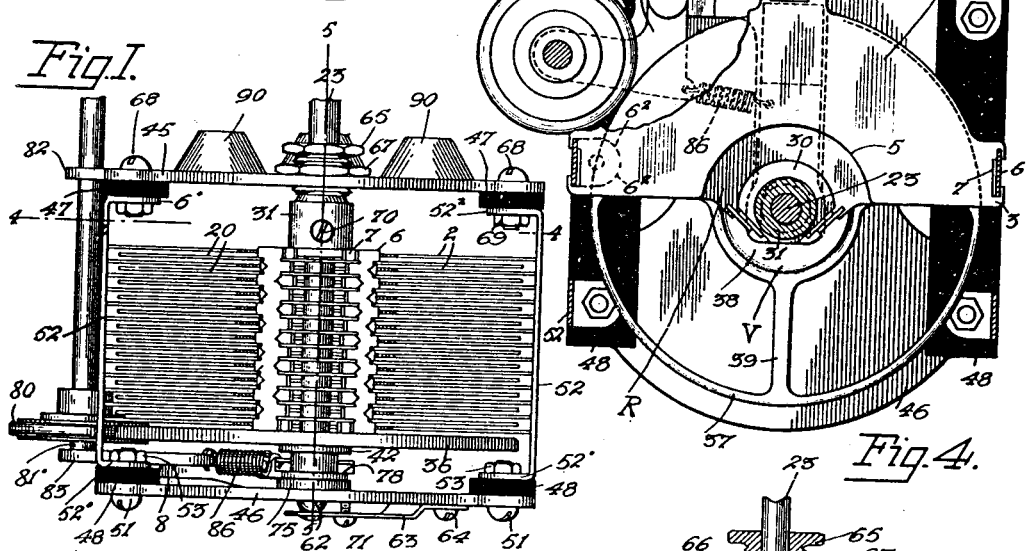
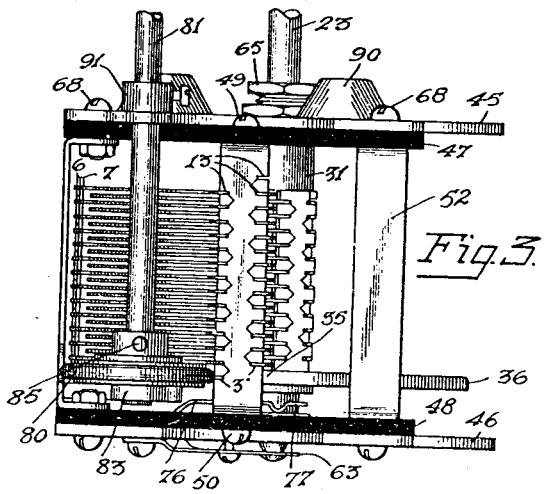
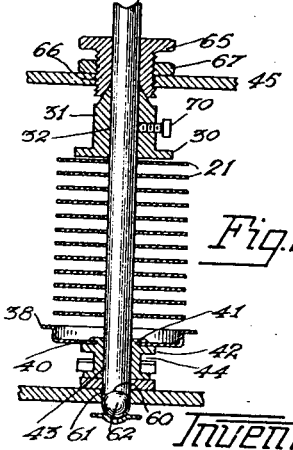
Inventor
Ernest A. Bohlman.
By Curtis B. Camp.
Attorney Patented Dec. 4, 1928.

1,693,588

UNITED STATES PATENT OFFICE.

ERNEST A. BOHLMAN, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

CONDENSER.

Application filed August 15, 1924. Serial No. 732,147.

My invention relates to condensers and has to do more particularly with variable condensers with an air dielectric, such as are now in general use in radio receiving sets, and is of the type in which the rotary plate element is operatively located in position relative to the fixed plates or stator element so that the capacity of the condenser may be made to vary in the desired manner, and an object of my invention is the provision of an improved variable condenser which is provided with novel features of construction which produce a condenser of simple construction and at the same time provide an improved condenser which is most efficient in its operation and is of the low loss type.

A feature of my invention is the means provided and the manner in which I support and space the plates of the rotor element to form a unit structure and also the plates of the fixed or stator element of my condenser to form a unit structure.

Another feature of my invention is the provision of a vernier element for my condenser which comprises a plate member which is loosely supported on the rotatable shaft of the rotor element and the means provided for rotating the vernier plate independent of the rotor element to obtain a finer adjustment after the rotor element has been adjusted without disturbing the adjustment of the rotor element.

Still another feature of my invention is the provision of means for rotatably supporting the actuating element of the vernier and the frictional means for maintaining the vernier element in its adjusted position.

The above features as well as others not specifically pointed out, will be pointed out in the ensuing specification, and for a better understanding of my invention reference may be had to the accompanying drawing, in which like reference characters in the several views denote like parts and in which:

Fig. 1 is an elevation of the condenser of my invention;

Fig. 2 is a plan view of Fig. 1;

Fig. 3 is a left side view of Fig. 1;

Fig. 4 is a sectional view along the line 4—4 of Fig. 1 with certain parts broken away to clearly illustrate the construction of my condenser.

Fig. 5 is a sectional view along the line 5—5 of Fig. 1, and

Fig. 6 is a fragmentary perspective view of a pair of supporting and spacing members and also a portion of a stator element to clearly illustrate the relation between the supporting and spacing members and the plate to secure them in spaced relation to each other.

The variable condenser of my invention comprises in general a stator element S, a rotor element R operatively associated with the stator element S and a vernier element V operable independent of the rotor element R and operatively associated with the end plate of the stator element S.

Referring now in detail to the stator element S it comprises a plurality of semi-circular plates 2 formed of suitable material such as brass. Each plate 2 of the stator element S is provided with three portions 3 spaced equi-distant apart and each of which is provided with a slot 4. The stator plates 2 are also provided with arcuate shaped recesses 5 for purposes as will presently be described. A pair of spacing and supporting members 6 and 7 are associated with each portion 3 for properly supporting the stator plates 2 and for spacing them in spaced relation to each other and the means provided for accomplishing this by means of the spacing and supporting members 6 and 7 will now be described. A plurality of notches 8 and 9 are provided in the sides of the spacing and supporting member 6, the said notches 8 and 9 being in staggered relation to each other. A plurality of notches 10 and 11 are also provided in the sides of the spacing and supporting member 7, the said notches 10 and 11 also being in staggered relation to each other. The portions 8' and 9' of the member 6 and the portions 10' and 11' of the member 7 are slightly smaller in width than the width of the notches 8 and 9, 10 and 11 in the respective members 6 and 7 so that when the members 6 and 7 are placed with their respective faces 12 and 12' against each other the portions 8' and 9' of the member 6 will position themselves over the notches 10 and 11 of the member 7 and the portions 10' and 11' of the member 7 will position themselves under the notches 8 and 9 of the member 6. Due to the fact that the portions 8' and 9', 10' and 11' are slightly smaller in width than the width of the notches 8 and 9, 10 and 11 in the respective spacing and supporting members 6 and 7, a plurality of notches 13 are formed opposite each other to form the proper spacing distance between the plates 2. To assemble the stator element S a predetermined number of plates 2 depending upon the rated capacity of the condenser are placed in a suitable fixture to properly space the plates 2 and properly align the plates 2. A pair of supporting and spacing members 6 and 7 are now matched together as above described to form the slots 13 which are of a width of about the thickness of the plates 2. The matched members 6 and 7 are now placed on the portions 3 of one of the aligned group, with the body portions 14 and 15 between the notches 8 and 9, 10 and 11 of the matched members 6 and 7 which are of a size to fit in the aligned slots 4 of the plates 2 resting in the said slots 4; the depth of the said slots 4 being such as to permit the edges 3' of the plates 2 to be substantially flush with the face 16 of the member 6 when the members 6 and 7 rest in the said slots 4. Heat and a suitable flux solder is now applied to the members 6 and 7 when in their position in the slots 4 as just described causing the solder to flow between the members 6 and 7 and in the notches 8 and 9 of the plate 6 which serve as pockets to receive the molten solder and allows the required amount of solder to flow into the slots 13 to secure the plates to the spacing and supporting members 6 and 7. The notches 8 and 9, 10 and 11 of the respective members 6 and 7 are provided with V shaped extremities which permit the solder which is applied to readily flow between the members 6 and 7 to secure them together. The two other aligned groups of recesses of the plates 2 are also associated with a pair of members 6 and 7 and the method of securing them in fixed relation with the stator plates 2 is the same as just described. After the three pair of spacing and supporting members 6 and 7 have been secured to the plates 2 as just described the plates 2 of the stator element S are in proper spaced relation to each other and form a unit structure which is of substantial construction and at all times maintains the respective plates 2 of the stator element S properly spaced.

Referring now to the rotor element R of my invention, it comprises a plurality of semicircular plates 20, formed of suitable material such as brass, each of said plates 20 being provided with an extended portion 21 which is provided with a suitable orifice 22 for receiving the shaft 23 of the rotor element R. A pair of notches 24 and 25 are provided in the extended portion 21 of the plates 20, and to assemble the rotor element R a predetermined number of plates 20 are placed in a suitable fixture and a pair of spacing and supporting members 6 and 7 are placed in each slot 24 and 25 which slots 24 and 25 are in alignment when placed in the fixture to permit the same to receive the members 6 and 7. The plates 20 and members 6 and 7 are now secured by means of heat and flux solder as described in connection with the assembly of the stator element S and therefore a further description is not thought necessary. A disk 30 is provided which is adapted to engage the top plate 20 of the rotor element R and its peripheral edge is also adapted to be soldered to the extended ends of the member 7. The disk 30 is provided with a hub member 31 integrally formed therewith which is provided with a central orifice 32 in alignment with the orifices 22 in the extended portions 21 of the plates 20 of the assembled rotor element R and which plates 20 are properly spaced in relation to each other by means of the spacing and supporting members 6 and 7 as described in connection with the stator element S to form a unit structure which is of substantial construction and at all times maintains the plates 20 of the rotor element in spaced relation with each other.

From the foregoing it will be apparent that by providing the plates with notches and by placing the spacing strips in the notches that the overall size of the plates may be reduced, it is also obvious in respect to the rotary plates, that by using this method of construction that the amount that it is necessary to cut away the stationary plates to permit the rotary plates to operate is materially reduced.

The vernier element V comprises a semicircular plate member 35 provided with a flange extension 36 and with an integrally formed narrow band 37, semi-circular in shape also provided with a flange extension, which flange extension is a continuation of the flange extension 36 of the vernier plate 35. A semi-circular dished extension 38 of the plate 35 is connected by a web 39 which prevents sagging of the integrally formed band 37 of the plate 35 and also maintaining the rigidity of the band. The extension 38 of the plate 35 is provided with an orifice 40 which is adapted to receive the reduced end 41 of a collar 42, which end 41 is spun over to secure the same to the extension 38. The collar 42 is provided with a central orifice 43 and a circumferential groove 44 and means for associating the vernier plate element V with the stator element S and the means for actuating this vernier element V independent of the rotor element R will presently be described.

To assemble the stator element S, rotor element R, and vernier element V to form an operating unit, I provide a pair of end plates 45 and 46 formed of suitable material such as brass between which the apparatus is supported. Two of the respective members 6 of the spacing and supporting members which are diametrically opposite are provided with angular extensions 6' and 6² to which are secured insulating strips 47 and 48 by means of screws 49 and 50 which pass through suitable orifices in the insulating strips 47 and 48 and have screw threaded engagement with suitable tapped orifices in the angular extensions 6' and 6² of the members 6. The insulating strips 48 secured to the angular extensions 6² of the members 6 are now in turn secured to the bottom or end plate 46 by means of screws 51 which pass through suitable orifices in the end plate 46, insulating strips 48 and angular extensions 52' of the bridge members 52 and have screw threaded engagement with nuts 53 which secure the insulating strips 48 and bridge members 52 to the end plate 46. When the stator element S is in position on the insulating strips 48 and in turn secured to the plate 46 the rotor element R is now placed in position with its plates 20 disposed between the plates 2 of the stator element S and the vernier plate 35 is placed in position between the stator plate 1 of the stator element S and the end plate 46. With the rotor element R and the vernier plate element V in position with the orifices 22 in the rotor plate extensions 21 and the orifice 43 in the collar 42 secured to the vernier plate 35 in alignment, the rotor shaft 23 is now inserted through the central orifice 32 in the hub portion 31 of the disk 30 secured to the rotor element R, aligned orifices 22 in the plates 20 the central orifice 43 in the collar 42 with its concave end 60 brought to rest in a suitable orifice 61 in the end plate 46 and in engagement with a ball bearing 62. The ball bearing 62 is held in engagement with the concave end 60 of the shaft 23 by a spring member 63 secured to the end plate 46 by means of a screw 64. With the elements S, R and V in this position the top or end plate 45 is placed in position with the rotor shaft 23 extending through an adjustable bearing member 65 which has screw threaded engagement with a suitable tapped orifice 66 in the plate 45. The end of the hub 31 of the disk 30 is conical in shape and rests in the conical shaped portion of the adjustable bearing member 65 and a lock nut 67 having screw threaded engagement with the bearing member 65 locks the same in its adjusted position in relation to the conical end of the hub 31. Suitable screws 68 passing through orifices in the plate 45, insulating strips 47 and angular extensions 52² of the bridge members 52 have screw threaded engagement with nuts 69 which secure the top plate 45 in position with the stator element S in turn secured to the insulating strips 47 and 48, the said strips insulating the stator element S from the end plates 45 and 46. The rotor element R is adjustably secured to the rotor shaft 23 against movement relative thereto by means of a set screw 70 which has screw threaded engagement with a suitable tapped orifice in the hub 31 to lock the rotor element R on the said shaft 23. The plates 20 of the rotor element R may be adjusted relative to the plates 2 of the stator element S by rotating the member 65 to the right or left as the case may be and when the desired adjustment is obtained the lock nut 67 is tightened down to hold the member 65 in adjusted position. The tension of the spring member 63 is sufficient to maintain the conical end of the hub 31 in constant engagement with the adjustable member 65 whereby the rotor element R is maintained in its longitudinally adjusted position. A screw 71 extends through an orifice in the spring member 63 and has screw threaded engagement with a tapped orifice in the plate 46 for providing the proper amount of tension on the spring 63 so that the proper amount of friction is maintained between the conical end of the hub 31 and the adjustable member 65 so that the rotor element R will be held in any of its adjusted positions.

The vernier element V is loosely supported on the rotor shaft 23, so that either may be rotated independent of the other and the means for actuating the vernier element will now be described. An L shaped member 75 is secured to the inside face of the plate 46, by suitable screws the forward end of which is provided with an orifice through which the shaft 23 extends. A spring member 76 has its one end secured to the member 75 by suitable screws and its other end 77 which is bifurcated is adapted to straddle the circumferential groove 44 in the collar member 42 secured to the vernier plate 35 and its formed forked end 77 engages the face 78 of the groove 44 and the tension of the spring 76 is such as to maintain the bottom face of the collar member 42 against the member 75 so as to keep the vernier plate 35 away from the end plate of the stator element S and at the same time provide frictional means for holding the vernier plate 35 in any of its adjusted positions. To rotate the vernier plate member V relative to the end plate of the stator element S I provide a rubber rimmed disk member 80 secured to the vernier shaft 81. The vernier shaft 81 extends through a suitable orifice in an integrally formed extension 82 of the end plate 45, its end 81' resting in a suitable orifice in an arm 83 which is pivoted to the L-shaped member 75 by means of a pivot pin 84. The rubber rimmed member 80 is adjustably secured on the shaft 81 by a set screw 85 and when adjusted to place the member 80 in engagement with the flange 36 of the vernier plate 35 and its integrally formed semi-circular band 37 the set screw 85 is tightened and maintains the member 80 in its adjusted position on the shaft 81. To maintain the rubber rimmed member 80 in frictional engagement with the flange 36 of the vernier plate 35 at all times and take up any wear of the rubber which occurs I provide a helical spring 86 one end of which is secured to the arm 83 and its other end secured to the spring 76.

To mount the condenser of my invention to a suitable panel or suitable means I provide three thimbles 90 integrally formed with the plate 45 provided with suitable tapped orifices which are adapted to receive screws which pass through orifices in the mounting panel. The thimbles 90 also form means for spacing the plate 45 of the condenser a suitable distance from the panel. The rotor shaft 23 and vernier shaft 81 will extend through suitable orifices in the mounting panel and the collar 91 secured to the vernier shaft 81 will prevent longitudinal movement of the vernier shaft 81. Suitable dials or control means will be secured to the protruding ends of the shafts 23 and 81 for rotating the rotor and vernier elements R and V.

To adjust the rotor element R relative to the stator element S the dial secured to the rotor shaft 23 will be grasped by the operator and turned until the proper adjustment is obtained. This adjustment of the rotor element R will be held by the frictional engagement between the conical end of the hub member 31 and the member 65. The recesses 5 in the plates 2 of the stator element S will permit the rotation of the rotor element R. After the coarse adjustment of the rotor element R is obtained a finer adjustment may be obtained by grasping the dial on the vernier shaft and rotating it and as the rubber rimmed member 80 is secured to the shaft 81 and held in frictional engagement with the flange 36 of the vernier plate 35 the vernier plate 35 is rotated independent of the adjusted rotor element R relative to the end plate of the stator element S and when the proper adjustment of the vernier plate 35 is obtained it is held in its adjusted position by the spring 76 as before described.

From the foregoing description it may be seen that I have designed a condenser which is simple in construction, of few parts and very simple and easily assembled as the stator element S and rotor element R and vernier element V are all unit assembles which greatly facilitate the assembly of the entire device. I provide also a novel and simple means for properly spacing the plates of my condenser and for permanently securing them to their spacing and supporting members thus eliminating any loss due to poor contact between the respective plates. I also provide a novel vernier arrangement in which I provide control means for obtaining a very minute adjustment of the vernier plate relative to the end plate of the stator element S. The end plates 45 and 46 are also formed to protect the plates of the condenser so that the same may be handled without the injuring of the plates.

I have illustrated and described a preferred embodiment of my invention; it is however understood that I do not wish to be limited to the exact structure as shown but aim to cover all such changes and modifications as come within the spirit and scope of the appended claims.

What I claim as new and desire to secure by United States Letters Patent is:

1. In a device of the character described including a pair of end plates, a stator element and a rotor element, each of said elements comprising a plurality of plates, a pair of members, each of said members being provided with notched sides, the portions between said notches being less than the distance across said notches, said members being adapted to be placed together so that the notches of one of said members are in staggered relation with the notches in the other of said members whereby the portions between the notches in one member cooperate with the notches in the other member to form slots to receive a portion of the circumferential edge of said plates whereby the said plates are supported and separated from each other by a pair of said members, and means formed integrally with certain of said members of said stator element for supporting said stator element between said end plates.

2. In a device of the character described including a pair of end members, a plurality of plates provided with notches in their circumferential edges; a pair of members, each of said members being provided with notched sides, said notches in the sides of said members being in staggered relation, the portions between said notches being smaller than the notches, said members being placed together so that notches of one of said members are in staggered relation to the notches in the other of said members whereby the portions between the notches in one member cooperate with the notches in the other member to form slots to receive a portion of the circumferential edge of said plates adjacent to the notches therein, the body portions of said members between the said notches resting in the notches in said plates, and means formed integrally with certain of said members for supporting certain of said plates between said end members.

3. In a device of the character described including a plurality of plates, notches in the circumferential edges of said plates, a pair of members, notches in the sides of each of said members, said portions between said notches being smaller than the notches, said members being placed together to space the notches of the respective members in staggered relation with each other whereby the portions between said notches in one member cooperate with the notches in the other member to form pairs of slots to receive a portion of the circumferential edge of said plates adjacent to said notches therein, said slots being of a size equal to the thickness of the plates, said notched members adapted to support and separate said plates, the body portion of said members between said slots resting in the notches in said circumferential edge of said plates.

4. A device of the character described including a pair of end plates, a stator element and a rotor element supported between said plates, a shaft for rotating said rotor element, a vernier plate element loosely supported by said rotor shaft, a second shaft supported by one of said end plates and a pivoted arm, a friction ring secured to said second shaft, supporting means for pivotally supporting said arm and means secured to said arm and said supporting means for frictionally holding said ring in engagement with said vernier plate to rotate said vernier element when said second shaft is rotated.

5. A device of the character described including a stator element and a rotor element, supporting plates for supporting said stator element and said rotor element, a shaft for rotating said rotor element, a vernier plate element loosely supported on said shaft, a second shaft rotatably supported in one of said supporting plates and a pivoted arm, supporting means secured to the other of said supporting plates to which said arm is pivotally secured, a frictional ring secured to said second shaft, and a helical spring secured to said arm and said supporting means for holding said friction ring in engagement with said vernier plate to cause rotation of said vernier element when said second shaft is rotated.

6. In a device of the character described including a plurality of conducting plates, members placed together in pairs, each pair of said members being provided with notches, the notches in one side of each of said members being in staggered relation with the notches in the other side of each of said members, and the portions between said notches being smaller in area than the said notches, said members adapted to be placed together so that the portions between the notches in one of said members cooperates with the notches in the other of said members to form slots, said slots being of a size equal to the thickness of said plates, and means formed with said plates substantially the same in size and shape as said slots for engaging said slots formed by said notches so that said plates are at right angles to said pairs of members and form a solid unitary structure with said members.

7. In a device of the character described including a plurality of conducting plates, a pair of members, provided with notches the area of which is greater than the area of the portions between said notches, the notches in one side of each of said pair of members being in staggered relation with the notches in the other side of each of said members, said notches of said members when placed together adapted to cooperate with the portions between the notches of the other of said members to form slots, and means substantially the same in size and shape as said slots formed with said plates for engaging said slots so that said plates and said members form a solid unitary structure and said plates are at right angles to said pair of members and parallel to each other but separated from each other.

8. In a device of the character described including a plurality of conducting plates, members placed together in pairs and provided with notched sides in zigzag relation to each other, the portions between the notches being less in area than the area of the notches, said notches in one member adapted to cooperate with the portions between the notches in the other member to form slots equal in width to the thickness of the plates, and means substantially the same in size and shape as said slots formed with said plates for engaging said slots in said pairs of members to form a solid unitary structure, said slots being arranged so that said plates are separated from each other and parallel with each other.

9. A device of the chracter described including a plurality of plates, a pair of members having notches in their respective sides the portions between said notches being less in area than the notches, placed together so that the notches in the sides of the respective members are in zigzag relation relative to each other and cooperate with the portion between the notches in the other member to form slots, so that two of said plates will enter slots formed by one notch and into slots formed by two adjacent notches, said parts fitting snugly in said slots and forming a solid unitary structure therewith whereby said members support and separate said plates.

10. A device of the character described including a rotary element and a stationary element, each of said elements comprising a plurality of conducting plates, members having notches in their respective sides in zigzag relation relative with each other, the portions between said notches being smaller in area than the notches, said members arranged in pairs so that said notches are in zigzag relation relative to each other and cooperate with the portions between the notches in the other member to form slots for receiving and separating said plates to form single mountable units, a pair of end plates, means formed integrally with certain of said members of said stator element for supporting said stator element between said end plates, a shaft for rotatably supporting said rotor element between said end plates in operative position with the plates of said stationary element.

11. A device of the character described including a rotary element and a stationary element, each of said elements comprising a plurality of conducting plates, members having notches in their respective sides in zigzag relation with each other, said members arranged in pairs so that the said notches of each member are in zigzag relation relative to each other to form slots for receiving and separating said plates to form single mountable units, a pair of end plates, means formed integrally with certain of said members of said stator element for supporting said stator element between said end plates, a shaft for rotatably supporting said rotor element between said end plates in operative position with the plates of said stator element, a vernier plate element loosely supported on said shaft, means including a frictional means for rotating said vernier element independent of said rotor element, means for pivotally supporting said frictional means, and means for maintaining said frictional means in engagement with said vernier plate element.

Signed by me at Chicago, in the county of Cook and State of Illinois, this 13th day of August 1924.

ERNEST A. BOHLMAN.